United States Patent [19]
Suzuki

[11] Patent Number: 4,602,153
[45] Date of Patent: Jul. 22, 1986

[54] FOCUS DETECTION APPARATUS FOR A CAMERA

[75] Inventor: Kenji Suzuki, Kawasaki, Japan

[73] Assignee: Canon Kabushiki Kaisha, Tokyo, Japan

[21] Appl. No.: 606,539

[22] Filed: May 3, 1984

[30] Foreign Application Priority Data

May 12, 1983 [JP] Japan ................. 58-81739

[51] Int. Cl.⁴ ............................. G02B 7/11
[52] U.S. Cl. ........................ 250/201; 250/204; 354/408
[58] Field of Search ...... 250/201 R, 201 AF, 201 PF, 250/204, 209; 354/402, 404, 406–409; 356/1, 4

[56] References Cited

U.S. PATENT DOCUMENTS

| | | | |
|---|---|---|---|
| 4,047,022 | 9/1977 | Holle | 250/201 PF |
| 4,250,376 | 2/1981 | Joseph et al. | 250/204 |
| 4,251,143 | 2/1981 | Stemme et al. | 250/201 PF |
| 4,297,571 | 10/1981 | Utagawa et al. | 250/201 PF |
| 4,333,007 | 6/1982 | Langlais et al. | 354/402 |

Primary Examiner—Edward P. Westin
Attorney, Agent, or Firm—Fitzpatrick, Cella, Harper & Scinto

[57] ABSTRACT

A focusing detection apparatus comprises an optical system for forming a plurality of images a relative positional relation of which changes in accordance with a focusing state of an object lens, a sensor for producing signals representing the images by detecting the images by a plurality of photo-electric elements, and arithmetic circuitry for determining the focusing state of the object lens based on the signals from the sensor. In order to determine the focusing state, the arithmetic circuitry carries out an operation of $$V = \sum_{i=1}^{N-1} \{a(i) \square b(i+1)\} - \sum_{i=1}^{N-1} \{a(i) \square b(i)\}$$

where V is a correlation, $a(i)$ and $b(i)$ are outputs of i-th photoelectric element of the sensor for the respective images, and $\{x \square y\}$ is a constant operational relationship for two real numbers x and y.

2 Claims, 15 Drawing Figures

DISTANCE BETWEEN ARRAYS OF
PHOTO-ELECTRO CONVERTING ELEMENT

DISTANCE BETWEEN ARRAYS OF
PHOTO-ELECTRO CONVERTING ELEMENT

FOCUS DETECTION APPARATUS FOR A CAMERA

BACKGROUND OF THE INVENTION

1. Field of the Invention

The present invention relates to a focusing detection apparatus for discriminating a focusing state of an object lens by detecting a relative positional relation of a plurality of object images.

2. Description of the Prior Art

As a focusing detection apparatus of a camera, an apparatus which detects a deviation between two images formed by dividing an exit pupil to determine an in-focus state has been known. For example, U.S. Pat. No. 4,185,191 issued on Jan. 22, 1980 discloses an apparatus which has a fly-eye lens arranged on an anticipated focal plane (which is conjugate with an imaging plane) of an imaging lens to form two images which are aberrated in accordance with a focusing error of the imaging lens. Japanese patent application Laid-Open Nos. 55-118019 laid open on Sept. 10, 1980 and 55-155331 laid open on Dec. 3, 1980 disclose a so-called secondary imaging process in which aerial images formed on an anticipated focus plane by two parallel arranged secondary imaging optical systems are directed to an image sensor to detect a positional deviation between the two images. The latter secondary imaging process requires a relatively long arrangement but does not need a special optical system such as a fly-eye lens which the former apparatus needs.

FIG. 1 schematically shows the secondary imaging process focusing detection apparatus. A field lens 3 is arranged coaxially with an optical axis 2 of an imaging lens whose focusing state is to be detected. Two secondary imaging lenses 4a and 4b are arranged behind the field lens 3 symmetrically with the optical axis 2. Photo-electric conversion element arrays 5a and 5b are arranged behind them. Irises 6a and 6b are arranged near the secondary imaging lenses 4a and 4b. The field lens 3 images an exit pupil of the imaging lens 1 on pupil planes of the two secondary imaging lenses 4a and 4b. As a result, light fluxes impinged to the secondary imaging lenses 4a and 4b exit from non-overlapping areas of equal size corresponding to the secondary imaging lenses 4a and 4b, on the exit pupil plane of the imaging lens 1. As the aerial image formed in the vicinity of the field lens 3 is refocused on the plane of the photo-electric conversion element arrays 5a and 5b by the secondary imaging lenses 4a and 4b, the positions of the two images on the photo-electric conversion element arrays 5a and 5b are shifted in accordance with a displacement of the aerial image in the optical axis direction. FIG. 2(A), 2(B) and 2(C) illustrate it. As shown in FIG. 2(A), the two images are at centers of the photo-electric conversion element arrays 5a and 5b in the in-focus state, as shown in FIG. 2(B), the two images are shifted away from the optical axis 2 in a far-focus state, and as shown in FIG. 2(C), the two images are shifted toward the optical axis 2 in a near-focus state. By photo-electrically converting the image intensity distribution and processing the resulting electrical signals to detect a positional deviation between the two images, the in-focus state can be determined.

One of the photo-electric converted signal processing systems is disclosed in U.S. Pat. No. 4,250,376. The following operation is carried out in analog or digital fashion.

$$V = \sum_{i=1}^{N-1} |a(i) - b(i+1)| - \sum_{i=1}^{N-1} |a(i+1) - b(i)| \quad (1)$$

where N is the number of photo-electric elements of the photo-electric conversion element array 5a or 5b, a(i) and b(i), are output signals of i-th photo-electric conversion elements of the photo-electric conversion element arrays 5a and 5b and V is a correlation.

The imaging lens 1 is driven out or in depending on whether the correlation V is positive or negative. In the signal processing system in accordance with the formula (1), only the direction of drive of the imaging lens 1 is determined.

In the focus detection apparatus which determines the in-focus state based on the deviation between images, it has been known to calculate the distance of movement of the image lens 1 by relatively displacing one of the images relative to the other based on the fact that the deviation between the two images is proportional to a focusing error. This method is old in a base line ranging type focusing detection apparatus, and it has also been known in a TTL type focusing detection apparatus, as shown by U.S. Pat. No. 4,387,975 issued on Jan. 14, 1983 and U.S. Pat. No. 4,333,007 issued on June 1, 1982. In those apparatuses the photo-electric converted signals of the images are converted by an A/D converter to a multi-bit digital data and the deviation between the two images is calculated by a microcomputer mounted in a camera to determine the focusing error. For example, the image represented by b(i) is relatively moved in the processing system relative to the image represented by a(i) and the amount of movement required for the coincidence of the two images is calculated to provide the deviation between the images. Namely, an operation of $$V_m = \Sigma |a(i) - b(i+1+m)| - \Sigma |a(i+1) - b(i+m)| \ldots \quad (2)$$

is repeatedly carried out while sequentially allocating integers within a predetermined range to a relative displacement m, to determine the relative displacement m which presents zero correlation $V_m$. Assuming that the correlation $V_m$ changes as shown in FIG. 3 when the relative displacement m changes within a range of $-4 \leq m \leq +4$, an image deviation corresponding to a pitch of 1.5 is determined because the correlation $V_m$ should be zero when the two images coincide.

The present applicant has proposed a manner to determine the direction of movement of the imaging lens in accordance with formula (3) or (4) shown below.

$$V = \sum_{i=1}^{N-1} \min\{a(i), b(i+1)\} - \sum_{i=1}^{N-1} \min\{a(i+1), b(i)\} \quad (3)$$

$$V = \sum_{i=1}^{N-1} \max\{a(i), b(i+1)\} - \sum_{i=1}^{N-1} \max\{a(i+1), b(i)\} \quad (4)$$

where min{x,y} represents a smaller one of two real numbers x and y, and max{x,y} represents a larger one of the two real numbers x and y. The present applicant has also disclosed a calculation method of the image deviation by using the formulas (3) and (4). For example, an image represented by b(i) of the formula (3) is moved relative to an image represented by a(i), and the following operation is carried out for each integer of the relative displacement m to determine the relative displacement m for $V_m = 0$ $$V_m = \Sigma \min\{a(i), b(i+1+m)\} - \Sigma \min\{a(i+1), b(i+m)\} \ldots \quad (5)$$

Similarly, for the formula (4), the following operation is carried out.

$$V_m = \Sigma \max\{a(i), b(i+1+m)\} - \Sigma \max\{a(i+1), b(i+m)\} \ldots \quad (6)$$

When the formulas (2), (5) and (6) are used, the relative displacement m for $V_m = 0$ is usually not an integer. Accordingly, it is usual to search the relative displacement m which causes a reversal of sign adjacent correlations $V_m$ and $V_{m+1}$ (that is, $V_m \cdot V_{m+1} \leq 0$) and interpolate a value. Since the number of the relative displacements m which meet the condition of $V_m \cdot V_{m+1} \leq 0$ is not always one, $|V_m - V_{m+1}|$ is operated for each of the m which meet $V_m \cdot V_{m+1} \leq 0$ and the relative displacement m which presents a largest change in the correlation $V_m$ is selected as the relative displacement m.

In the formulas (1), (3) and (4), the photo-electric converted signals a(i) and b(i) are shifted by one pitch respectively, and the set of the shifted a(i) and the non-shifted b(i) and the set of the non-shifted a(i) and the shifted b(i) are processed and a difference between the processing results for each i is calculated. Thus, the formulas (1), (3) and (4) are rewritten as $$V = \Sigma \{a(i) \square b(i+1)\} - \Sigma \{a(i+1) \square b(i)\} \ldots \quad (7)$$

where $x \square y$ represents an operational relation for two real numbers x and y. This is illustrated in FIG. 4(A) in which data sets to be processed are connected by solid lines or broken lines. The set of two data connected by the digital broken line represents an operation $a(i) \square b(i+1)$ for the first sum in the right side of the formula (7), and the set of two data connected by the diagonal solid line represents an operation $a(i+1) \square b(i)$ for the second sum of the right side of the formula (7). Similarly, the formulas (2), (5) and (6) are rewritten as $$V_m = \Sigma \{a(i) \square b(i+1+m)\} - \Sigma \{a(i+1) \square b(i+m)\} \ldots \quad (8)$$

This is illustrated in FIG. 4(B). In FIG. 4(B), the operation is carried out for all areas in which the two images overlap. In this method, the length of the operation area varies depending on the relative displacement m. As a result, undesirable result is obtained if a high intensity object is present at a position slightly displaced from an area under measurement. To avoid the above inconvenience, the operation area length may be unified to the shortest length so that the same operation length is used to all relative displacements m. In FIG. 4(B) the operation area length is unified to that of $n = \pm 2$.

In the prior art method shown by the formulas (7) and (8), the deviations which are bases of the operations of the first sum and the second sum in the formulas (7) and (8) differ from each other by two pitches, as seen from FIGS. 4(A) and 4(B). For example, a(2) has an operational relation with b(1) and b(3). On the other hand, in the image deviation system focusing detection method, the relative shift of two images in processing is equivalent to the change of the focusing error in a sense of simulation and the shift of portion by one pitch corresponds to a predetermined change in the focusing error.

Accordingly, if the focusing error corresponding to the two-pitch image deviation is small and a high density simulation is attained, a high precision focusing detection operation is possible accordingly. However, to this end, an element pitch of the photo-electric conversion element arrays 5a and 5b must be small, and for a given size of the area to be measured, the data quantity increases and a load to the electrical processing circuit increases as the pitch becomes small. For example, in a processing system which uses a microcomputer, the increase of the data quantity directly leads to the increase of a data memory capacity, the increase of a cost, the increase of a processing time and reduce a real-time ability of the focusing detection apparatus. Further, the photo-sensitive areas of the photo-electric conversion elements of the arrays 5a and 5b reduces and a sensitivity reduces. Thus, there is a limit in reducing the pitch of the photo-electric conversion element arrays 5a and 5b. As a result, the focusing error for the two-pitch image deviation cannot be significantly reduced and the precision of the operation is not high. Accordingly, in the prior art processing system, it is difficult to improve the discrimination precision.

SUMMARY OF THE INVENTION

It is an object of the present invention to provide a focusing detection apparatus which can improve a processing precision even if a pitch of photo-electric conversion sampling points to an image is relatively large.

The other objects of the present invention will be apparent from the following description of the preferred embodiments of the present invention.

DETAILED DESCRIPTION OF THE PREFERRED EMBODIMENTS

Figure 1:
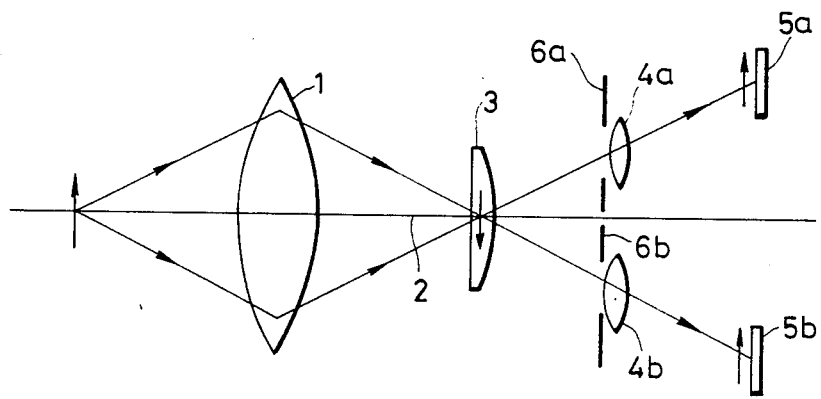
FIG. 1 schematically shows an optical system of a focusing detection apparatus.
Figure 2A:
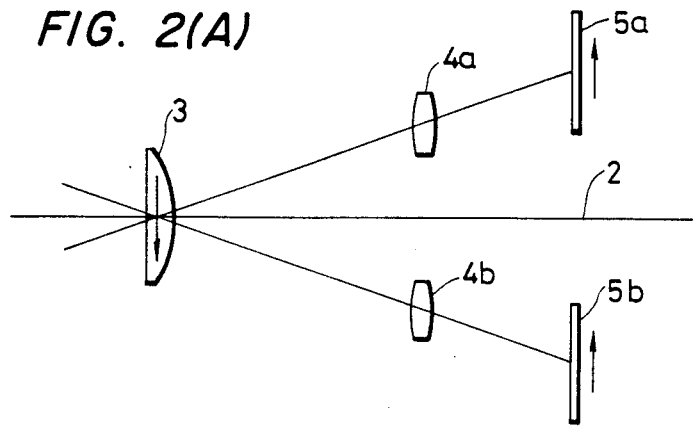
FIGS. 2(A) to 2(C) show relations between focusing states of an object lens and image deviations in the optical system of FIG. 1.
Figure 2B:
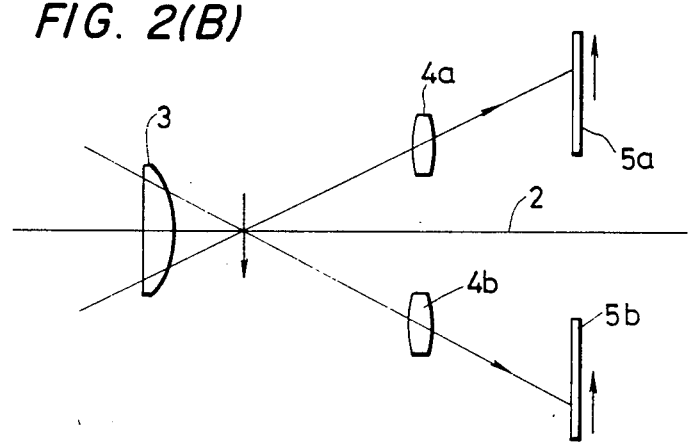
Figure 2C:
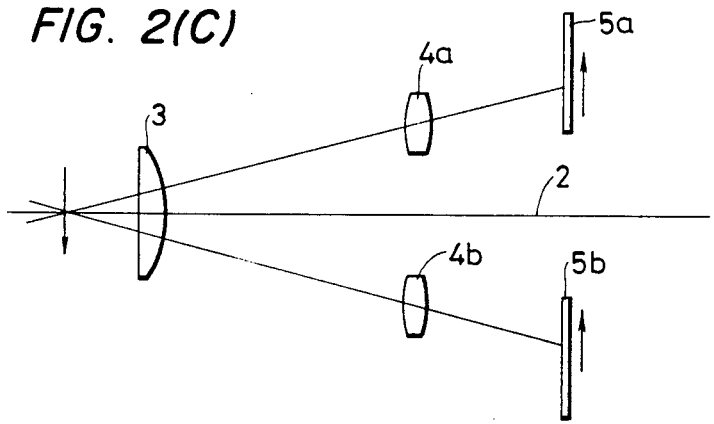
Figure 3:
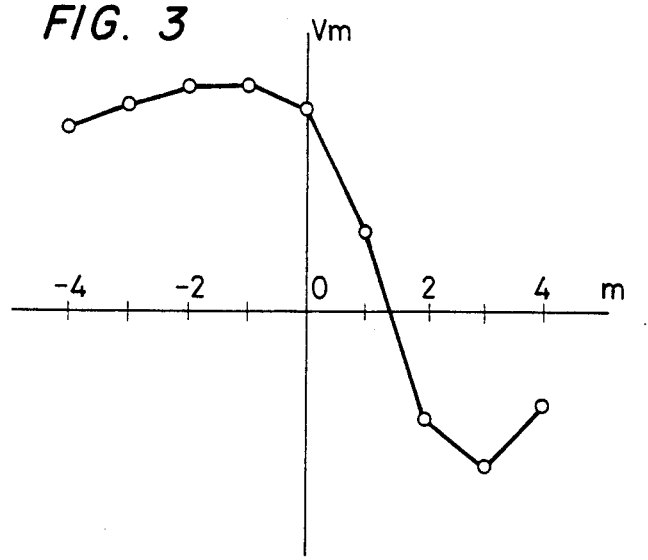
FIG. 3 shows a result processed by a prior art processing system.

The present invention is now explained in detail with reference to the preferred embodiments. An optical system used therein may be similar to that shown in FIG. 1 and hence the explanation therefor is omitted here.

In the present invention, the following formula (9) is used as a basic correlation with the image deviation of the image b(i) relative to the image a(i) being one pitch.

$$V = \sum_{i=1}^{N-1} \{a(i) \Box b(i+1)\} - \sum_{i=1}^{N-1} \{a(i) \Box b(i)\} \quad (9)$$

The image deviation is calculated by the following formula (10).

$$V_m = \Sigma\{a(i) \Box b(i+1+m)\} - \Sigma\{a(i) \Box b(i+m)\} \ldots \quad (10)$$

By specifically representing the operation symbol □, the formula (9) is rewritten for the formula (1) as $$V = \Sigma |a(i) - b(i+1)| - \Sigma |a(i) - b(i)| \ldots \quad (11)$$

the formula (10) is rewritten for the formula (2) as $$V_m = \Sigma |a(i) - b(i+1m)| - \Sigma |a(i) - b(i+m)| \ldots \quad (12)$$

the formula (9) is rewritten for the formula (3) as $$V = \Sigma \ min\{a(i), b(i+1)\} - \Sigma\{min \ a(i), b(i)\} \ldots \quad (13)$$

and the formula (10) is rewritten for the formula (5) as $$V_m = \Sigma min\{a(i), b(i+1+m)\} - \Sigma min\{a(i), b(i+m)\} . \quad (14)$$

Further, the formula (9) is rewritten for the formula (4) as $$V = \Sigma \ max\{a(i), b(i+1)\} - \Sigma\{max \ a(i), b(i)\} \ldots \quad (15)$$

and the formula (10) is rewritten for the formula (6) as $$V_m = \Sigma max\{a(i), b(i+1+m)\} - \Sigma max\{a(i), b(I+m)\} \ldots \quad (16)$$

In the formulas (11), (13) and (15), i is an integer between 1 and N-1 where N is the number of photo-electric elements of the photo-electric conversion array 5a or 5b. In the formulas (12), (14) and (16), i changes such that the outputs of photo-electric conversion element arrays for the area in which the two images overlap (the area varying depending on the relative displacement m) are used for the operation.

Figure 5:
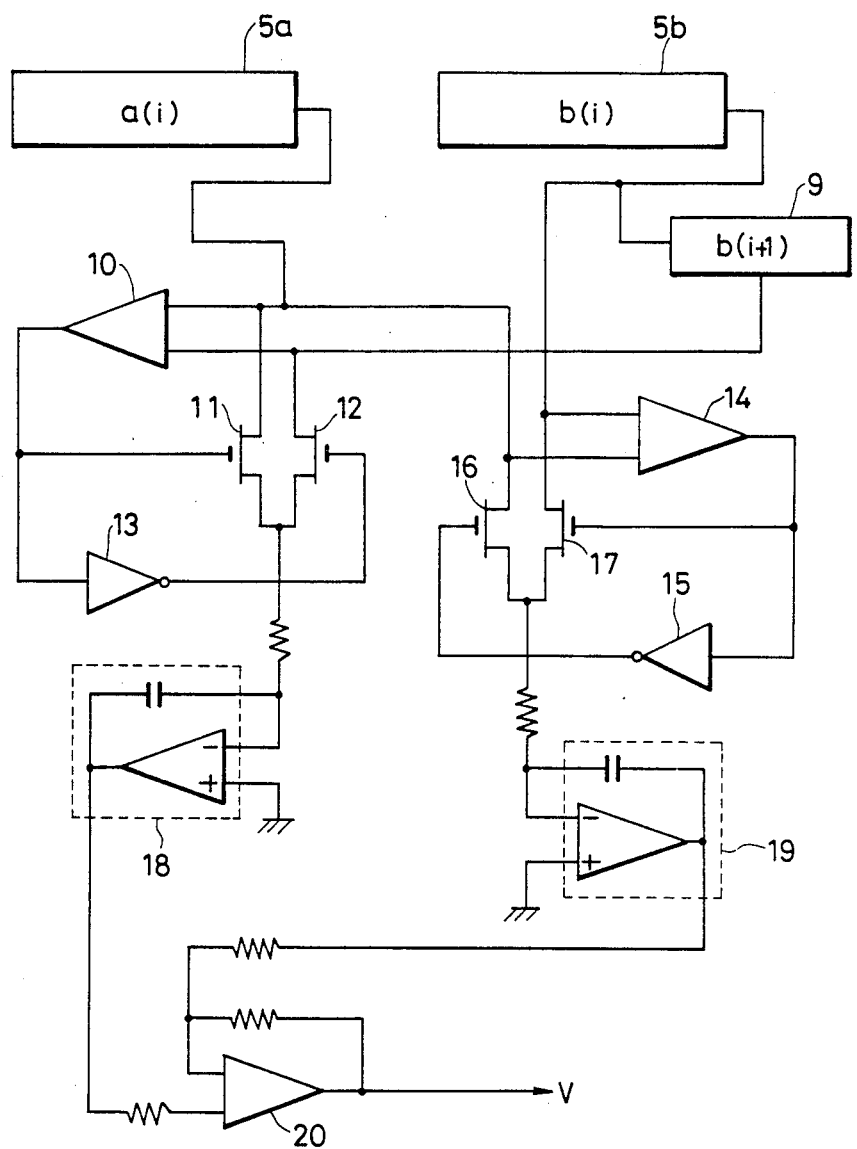
FIG. 5 shows one embodiment of a processing circuit in a focusing detection apparatus of the present invention.

FIG. 5 shows a processing circuit for carrying out the operation of the formula (13). The photo-electric conversion element arrays 5a and 5b each comprised N photo-electric conversion elements and produces a photo-electric converted signal a(i) or b(i) as a time-serial signal. The photo-electric converted signal b(i) is shifted by an analog shift register 9 by one bit to produce a photo-electric converted signal b(i+1). A comparator 10 compares the photo-electric converted signal a(i) with the photo-electric converted singal b(i+1) and turns on an analog switch 11 when a(i)<b(i+1), and turns on an analog switch 12 through an inverter 13 when a(i)>b(i+1). A comparator 14 compares the photo-electric converted signal a(i) with the photo-electric converted signal b(i), and turns on an analog switch 16 through an inverter 15 when a(i)<b(i) and turns on an analog switch 17 when a(i)>b(i). Accordingly, an integrator 18 which comprises a capacitor and an operational amplifier carries out the operation $\Sigma \ min\{a(i), b(i+1)\}$ and an integrator 19 which is similar to the integrator 18 carries out the operation $\Sigma\{a(i), b(i)\}$. A subtractor 20 subtracts the output of the integrator 19 from the output of the integrator 18 to produce an output V which is an analog operation result of the formula (13).

In order to calculate the correlation $V_m$ of the formula (14), a relative delay is applied to the time-serial outputs of the photo-electric conversion element arrays 5a and 5b. For example, a delay element for imparting a delay corresponding to the relative displacement m is inserted between the photo-electric conversion element array 5b and the analog shift register 9, or a start time to read out the photo-electric conversion element array 5b is controlled.

When the operation is digitally carried out by a microcomputer, the time-serial outputs of the photo-electric conversion element arrays 5a and 5b are A/D-converted and the A/D-converted signals are stored in a memory and processed under a control of software.

When the symbol x□y in the formulas (9) and (10) are replaced by $|x-y|$ or $max\{x, y\}$, similar operation process is applicable.

Figure 4A:
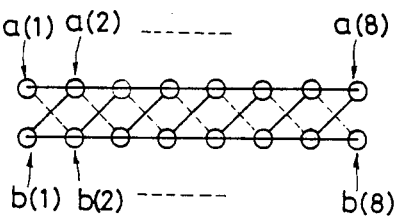
FIGS. 4(A) and 4(B) show image deviations in the prior art processing system.
Figure 4B:
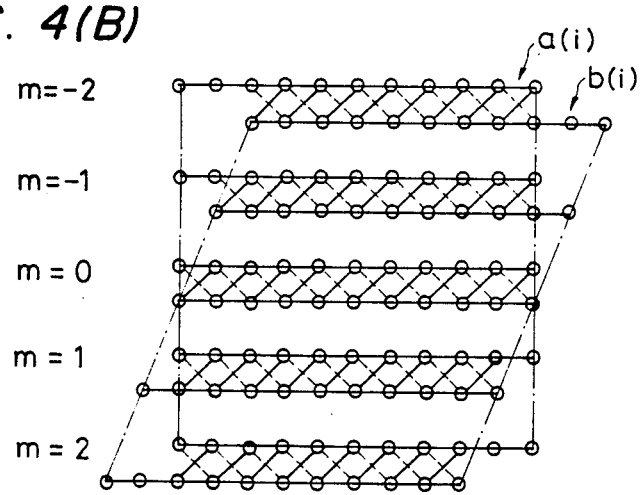
Figure 6A:
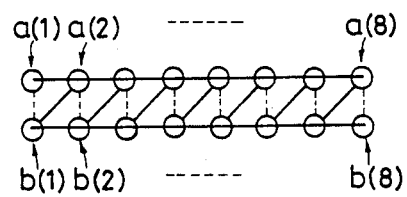
FIGS. 6(A) and 6(B) show image deviations in the processing system of the present invention.
Figure 6B:
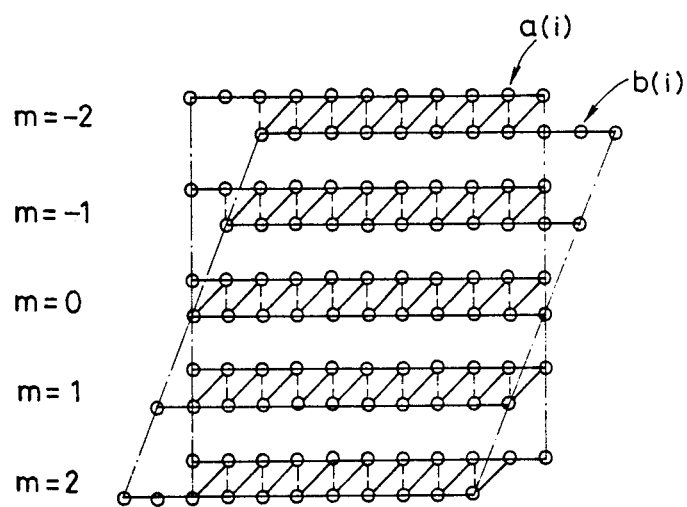
Figure 7:
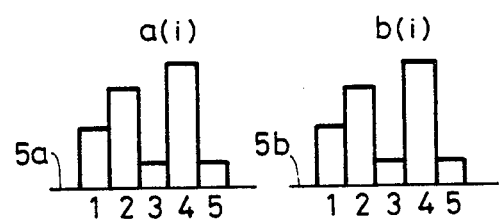
FIG. 7 shows outputs of photo-electric conversion arrays when an object lens is in an in-focus state.

FIGS. 6(A) and 6(B) illustrate the operational relations in the formulas (9) and (10) in a similar manner to that of FIGS. 4(A) and 4(B). As seen from FIGS. 6(A) and 6(B), the image is deviated by one pitch only in the first summation in the formulas (9) and (10) and the image is not deviated in the second summation so that a total image deviation is equal to one pitch, that is, one element of the photo-electric conversion element arrays 5a and 5b. In this manner, the precision of the operation is improved. This will be explained for an example where the number of elements of the photo-electric conversion element arrays 5a and 5b is equal to 5 and the outputs a(i) and b(i) are those shown in FIG. 7. FIG. 7 shows the outputs when the two images formed on the arrays 5a and 5b perfectly coincide for all i's, that is, when the imaging lens 1 is in an in-focus state.

Figure 8:
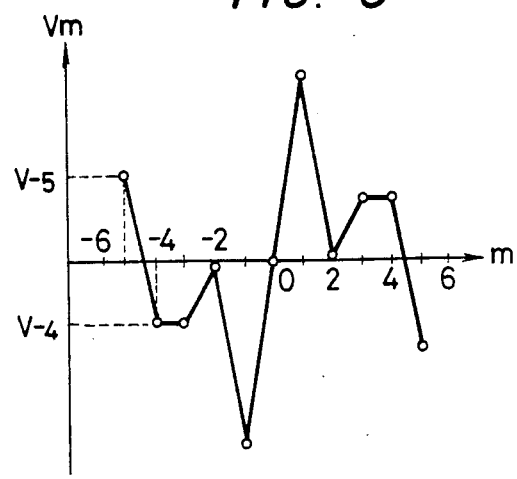
FIG. 8 shows a result of processing for the outputs of FIG. 7 in accordance with the prior art processing system.
Figure 9:
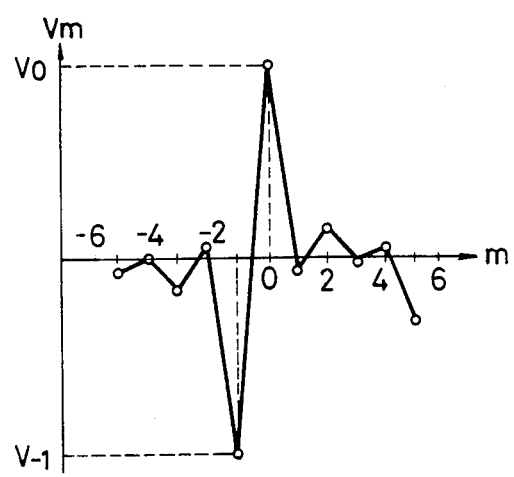
FIG. 9 shows a result of processing of the outputs of FIG. 7 in accordance with the present processing system.

FIG. 9 shows a plot of the correlation $V_m$ calculated in accordance with the formula (12) based on a(i) and b(i) of FIG. 7 versus the relative displacement m, and FIG. 8 shows the correlation $V_m$ calculated in accordance with the formula (2) based on the data of FIG. 7.

Figure 10A:
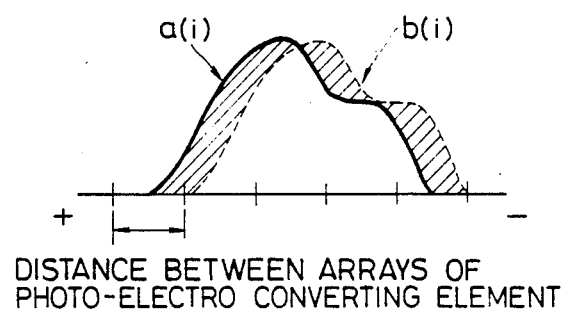
FIGS. 10(A) and 10(B) show outputs of the photo-electric conversion element arrays to illustrate an image deviation in the present processing system.
Figure 10B:
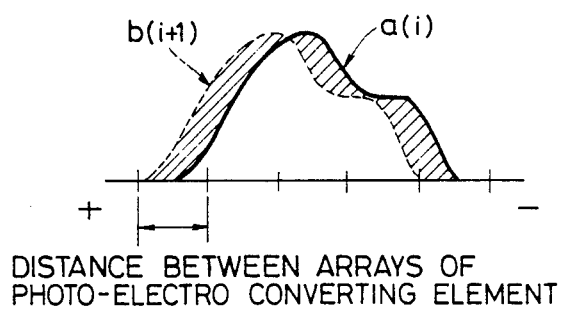

In FIG. 9, an origin of the image deviation is not at m=0 but at m=−0.5. This is due to the fact that the image deviation processing for the two images a(i) and b(i) lacks a symmetry. The correlation V in the formula (9) is zero when the two images a(i) and b(i) are shifted in a negative direction by 0.5 pitch of the photo-electric conversion element arrays 5a and 5b, as shown in FIG. 10A. For example, in the first formula (12), the first summation corresponds to a hatched area in FIG. 10(B), the second summation corresponds to a hatched area of FIG. 10(A), and both hatched areas are of equal area. Thus, the relative displacement m for zero image deviation and the relative displacement m for $V_m=0$ differ by 0.5. Accordingly, in order to obtain a correct image deviation, the operations are carried out for a plurality of integers m and the integer m which satisfies $V_m \cdot V_{m+1} \leq 0$ and presents a maximum $|V_m - V_{m+1}|$ is searched, and a real number solution m for $V_m=0$ in a closed section [m, m+1] is determined. Thereafter, a correction term of 0.5 is added to the m. The above operation steps are equally applicable to the formulas (14) and (16).

As seen from FIG. 9, in the operation as represented by the formula (10), an abrupt change is observed near the relative displacement m for $V_m=0$. As a result, even if the correlation $V_m$ changes by a noise, the m for $V_m = 0$ does not substantially change and a high image deviation detection sensitivity is attained. On the other hand, in the prior art system shown in FIG. 8, the m for $V_m = 0$ changes significantly as the correlation $V_m$ changes by the noise.

In FIG. 8, there exist zero-crossing points having large variations between $V_{-5}$ and $V_{-4}$ and between $V_4$ and $V_5$, and hence there is a possibility of misjudgement. The variations $|V_5 - V_4|$ and $|V_{-4} - V_{-5}|$ of the correlation $V_m$ at those points are essentially equal to the variations $|V_1 - V_0|$ and $|V_0 - V_{-1}|$ at true zero-crossing points. On the other hand, in FIG. 9 of the present invention, the variation $|V_0 - V_1|$ of the correlation $V_m$ at the true zero-crossing point in much larger than the variation $|V_5 - V_4|$ or $|V_2 - V_1|$ at other insignificant zero-crossing points. Accordingly, a possibility of misjudgement is low.

When the in-focus state is discriminated in accordance with the formula (9), a position displaced from the position of the imaging lens 1 when the correlation V is zero, by a distance corresponding to 0.5 pitch is determined as the in-focus state.

In the formulas (9) and (10), since the image deviation required to calculate the correlations V and $V_m$ is one half of that required in the prior art method, they are particularly effective when the object has a fine structure pattern. When the waveforms of the images a(i) and b(i) include many high frequency components which are close to a Nyquist frequency of the photo-electric conversion element arrays 5a and 5b, the discrimination is difficult by the prior art method but the present method enables the discrimination in many cases.

In the present invention, no image deviation is effected in the second summation of the formula (9) or (10). Accordingly, the processing is easier than the prior art method.

In the above description, the present invention is applied to the TTL type focusing detection apparatus in which the image formed by the light fluxes transmitted through the imaging lens 1 has been described. The present invention is also applicable to a base line range finder type focusing detection apparatus which utilizes the deviation between two images. While the photo-electric conversion means described above uses the photo-electric conversion element arrays, it may be replaced by a solid-state imaging device having N equi-spaced sampling points.

As described hereinabove, according to the present invention, the processing means which carries out the operation of $$V = \sum_{i=1}^{N-1} \{a(i) \square b(i+1)\} - \sum_{i=1}^{N-1} \{a(i) \square b(i)\}$$

is provided and the image deviation in the processing is set to one pitch of the photo-electric conversion sampling points. Accordingly, the processing accuracy is improved even if the pitch is relatively large.

What I claim is:

1. A focusing detection apparatus for detecting a focusing state of an object lens, comprising:

optical means for forming first and second images a relative positional relation of which changes in accordance with the focusing state of the object lens;

first and second sensing means for sensing the first and second images, respectively; and discrimination means for discriminating the focusing state of the object lens in accordance with outputs of said first and second sensing means;

said discrimination means calculating a correlation V for discriminating the focusing state of the object lens in accordance with $$V = \sum_{i=1}^{N-1} \{a(i) \square b(i+1)\} - \sum_{i=1}^{N-1} \{a(i) \square b(i)\}$$

where N is the number of photo-electric conversion elements of said first or second sensing means, a(i) and b(i) are outputs of i-th photo-electric conversion elements of said first and second sensing means, respectively, and $\{x \square y\}$ is a constant operational relation for two real numbers x and y.

2. A focusing detection apparatus according to claim 1 wherein $\{x \square y\}$ is one of $|x-y|$, $\{\max x, y\}$ and $\{\min x, y\}$.

* * * * *

UNITED STATES PATENT AND TRADEMARK OFFICE
CERTIFICATE OF CORRECTION

PATENT NO. : 4,602,153

DATED : July 22, 1986

INVENTOR(S) : KENJI SUZUKI

It is certified that error appears in the above-identified patent and that said Letters Patent is hereby corrected as shown below:

COLUMN 5

```
Line 17, "V=Σa(i)" should read --V=Σ|a(i)--.
Line 36, ", b(I+m)}" should read --, b(i+m)}--.
```

Signed and Sealed this

Thirty-first Day of May, 1988

Attest:

DONALD J. QUIGG

Attesting Officer

Commissioner of Patents and Trademarks